(12) United States Patent
Sudo

(10) Patent No.: US 10,165,189 B2
(45) Date of Patent: Dec. 25, 2018

(54) ELECTRONIC APPARATUS AND A METHOD FOR CONTROLLING THE SAME

(71) Applicant: CANON KABUSHIKI KAISHA, Tokyo (JP)

(72) Inventor: Koji Sudo, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 15/151,227

(22) Filed: May 10, 2016

(65) Prior Publication Data

US 2016/0255279 A1    Sep. 1, 2016

Related U.S. Application Data

(63) Continuation of application No. 14/137,624, filed on Dec. 20, 2013, now Pat. No. 9,360,962.

(30) Foreign Application Priority Data

Dec. 27, 2012   (JP) .................................. 2012-284431

(51) Int. Cl.
*H04N 5/232*   (2006.01)
*G06F 3/00*    (2006.01)
(Continued)

(52) U.S. Cl.
CPC ....... *H04N 5/23293* (2013.01); *G06F 1/1694* (2013.01); *G06F 3/0416* (2013.01);
(Continued)

(58) Field of Classification Search
CPC .... G06F 3/0416; G06F 3/0488; G06F 1/1694; G06F 2200/1637; H04N 5/23216; H04N 5/23293
See application file for complete search history.

(56) References Cited

U.S. PATENT DOCUMENTS

2005/0052407 A1* 3/2005 Okada ................ H04N 5/23203
345/156
2006/0061663 A1* 3/2006 Park ....................... H04N 5/232
348/211.2
(Continued)

FOREIGN PATENT DOCUMENTS

JP         10-207633 A     8/1998
JP         2006-186522 A   7/2006
(Continued)

*Primary Examiner* — Jason A Flohre
(74) *Attorney, Agent, or Firm* — Canon USA Inc IP Division

(57) ABSTRACT

An electronic apparatus includes a touch detection unit configured to detect a touch on a display unit, an orientation detection unit configured to detect an orientation of the electronic apparatus, a display control unit configured to perform control so that a display position of a display item displayed on the display unit is changed if a predetermined change of the orientation of the electronic apparatus is detected by the orientation detection unit, and a control unit configured to perform control so that, if the predetermined change of the orientation of the electronic apparatus occurs, processing based on a touch operation of a touch that has been detected by the touch detection unit since before the predetermined change occurs is not performed.

27 Claims, 9 Drawing Sheets

(51) Int. Cl.
*G06F 1/16* (2006.01)
*G06F 3/041* (2006.01)
*G06F 3/0488* (2013.01)

(52) U.S. Cl.
CPC ....... *G06F 3/0488* (2013.01); *H04N 5/23216* (2013.01); *G06F 2200/1637* (2013.01)

(56) References Cited

U.S. PATENT DOCUMENTS

| | | | | |
|---|---|---|---|---|
| 2006/0146166 | A1* | 7/2006 | Abe | H04N 5/232 348/333.01 |
| 2009/0061947 | A1* | 3/2009 | Park | G06F 1/1624 455/566 |
| 2010/0062803 | A1* | 3/2010 | Yun | H04N 5/23216 455/556.1 |
| 2010/0214465 | A1* | 8/2010 | Suzuki | H04N 5/23216 348/333.02 |
| 2010/0231777 | A1* | 9/2010 | Shintani | H04N 5/232 348/333.06 |
| 2011/0267530 | A1* | 11/2011 | Chun | H04N 5/23212 348/333.11 |
| 2012/0133678 | A1* | 5/2012 | Kim | G06F 3/0488 345/649 |
| 2012/0176508 | A1* | 7/2012 | Jeong | H04N 5/2251 348/231.2 |
| 2013/0120635 | A1* | 5/2013 | Kim | H04N 5/23219 348/333.06 |
| 2013/0227483 | A1* | 8/2013 | Thorsander | G06F 3/04842 715/821 |

FOREIGN PATENT DOCUMENTS

| | | |
|---|---|---|
| JP | 2010-026710 A | 2/2010 |
| JP | 2011-034140 A | 2/2011 |
| JP | 2011-128187 A | 6/2011 |
| JP | 2011-159180 A | 8/2011 |
| JP | 2011-193249 A | 9/2011 |
| JP | 2012-069045 A | 4/2012 |
| WO | 2011-065249 A1 | 6/2011 |

* cited by examiner

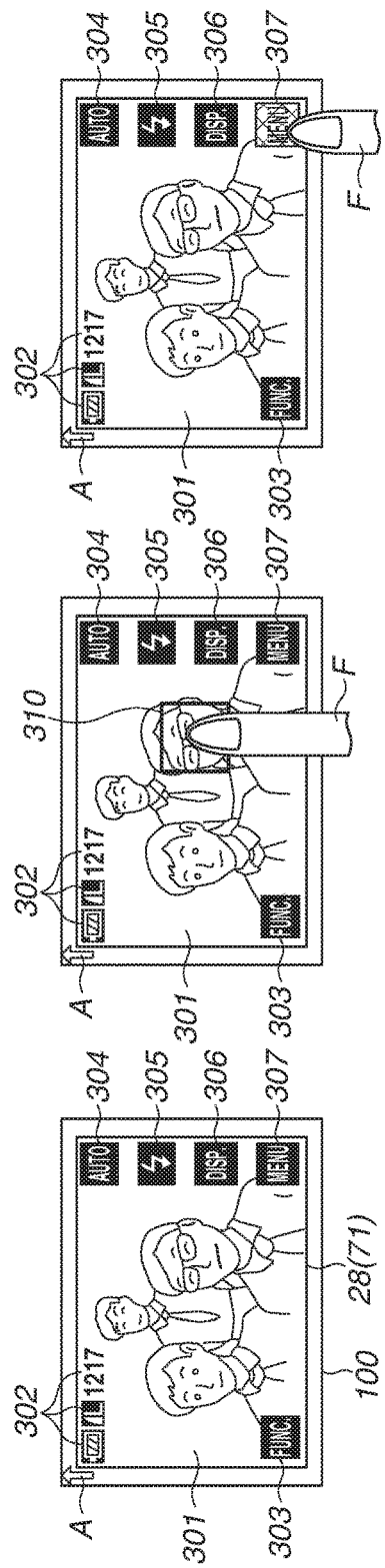

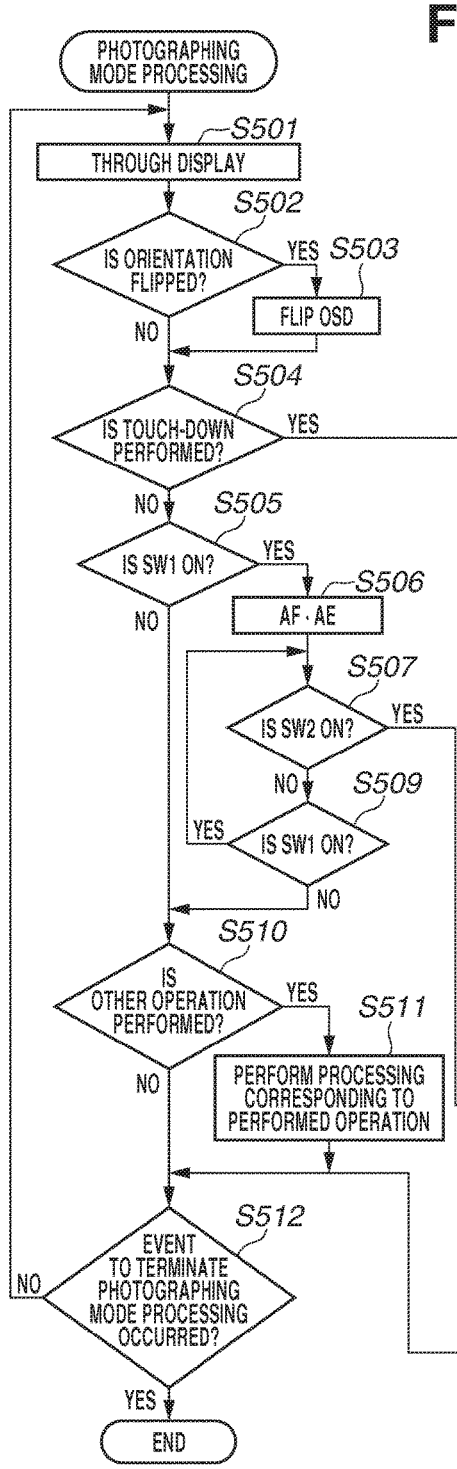
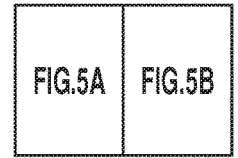
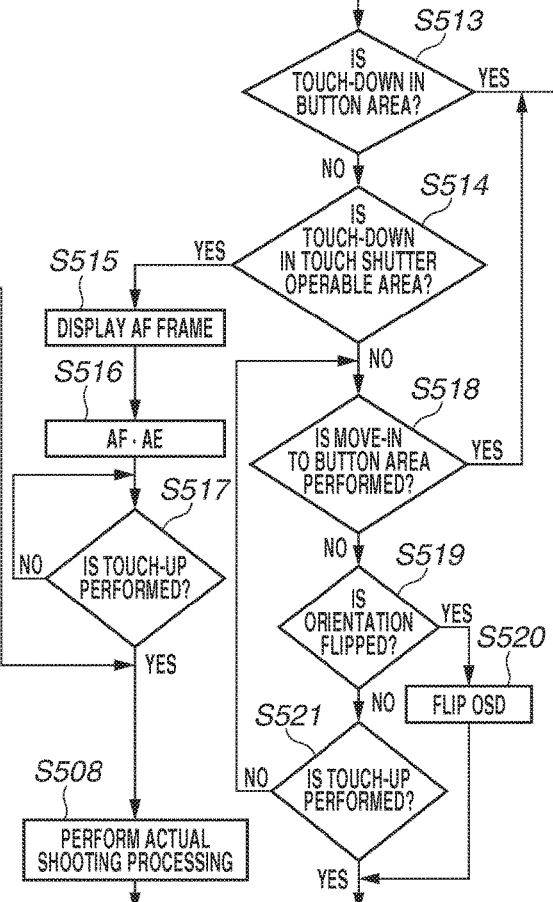

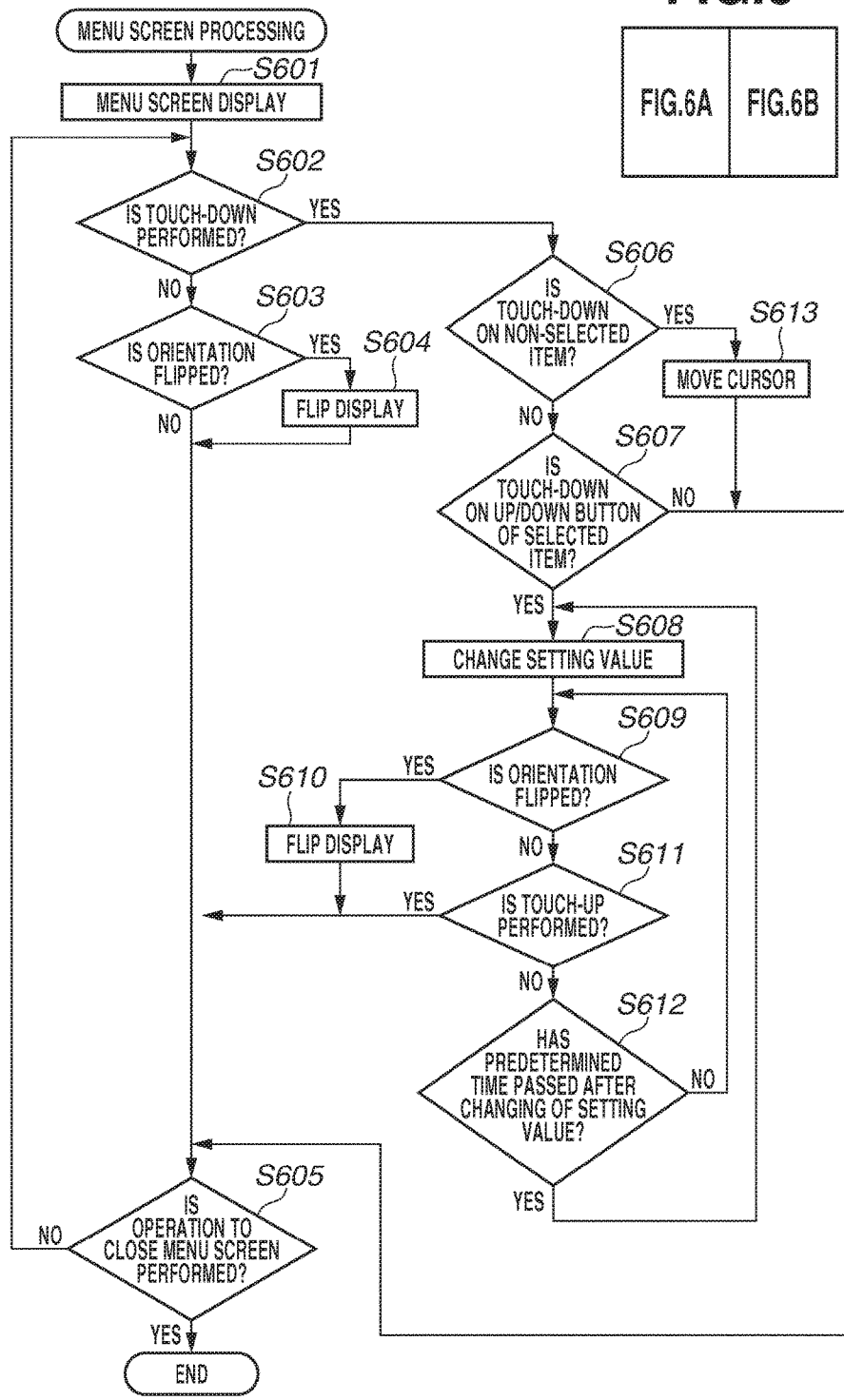

ELECTRONIC APPARATUS AND A METHOD FOR CONTROLLING THE SAME

CROSS REFERENCE TO RELATED APPLICATIONS

The present application is a Continuation of U.S. patent application Ser. No. 14/137,624 filed Dec. 20, 2013, which claims the benefit of priority from Japanese Patent Application No. 2012-284431 filed Dec. 27, 2012, each of which is hereby incorporated by reference herein in their entirety.

BACKGROUND OF THE INVENTION

Field of the Invention

The present disclosure generally relates to electronics and, more particularly, to an electronic apparatus including a touch panel and capable of detecting an orientation thereof, and to a method for controlling the electronic apparatus.

Description of the Related Art

Recently, the use of a touch panel in electronic apparatuses, such as an imaging apparatus and a mobile phone, has become more popular.

In Japanese Patent Application Laid-Open No. 2011-193249, an imaging apparatus is discussed in which automatic focusing (AF) can be performed based on the touched position on a touch panel, and photographing can be performed in response to the touch being released.

In Japanese Patent Application Laid-Open No. 10-207633, a display device with a touch panel is proposed in which even when relative orientation between the user and the touch panel is changed, operational feeling of the user is unchanged. Specifically, a technique is discussed that changes a display original point so that when the orientation of the touch panel changes with respect to the user, displayed items are rotated to be displayed. Furthermore, a technique of changing an original point of a touch input and converting coordinates of the touched position into those based on the changed original point has been proposed.

In an apparatus such as that discussed in Japanese Patent Application Laid-Open No. 10-207633, the displayed positions of display items such as a touch icon are changed in accordance with a change in the display original point caused by the change in the orientation of the touch panel. Thus, when the orientation of the touch panel that is being touched changes, if the touched position of the user remains the same after the orientation is changed, the touch icon that has been touched before the orientation is changed might be displayed at a position different from the touched position after the orientation is changed. Accordingly, if a function allocated to the touch icon that has been touched before the orientation is changed is executed after the orientation is changed, a function of a touch icon that is displayed at a position different from the touched position is executed. Therefore, a function intended by the user might not be executed after the orientation is changed, and thus an operational error might occur. On the other hand, execution of a function of the touch icon displayed at the touched position after the orientation is changed is an operational error if the user thought that the function of the touch icon that has been touched before the orientation is changed will be executed even after the orientation is changed. Such problems are particularly the case in a mobile apparatus discussed in Japanese Patent Application Laid-Open No. 2011-193249, where an orientation of a touch panel that is being touched can be easily switched between vertical, horizontal, upside down, and the like.

SUMMARY OF THE INVENTION

The present disclosure is directed to an electronic apparatus that can increase the possibility that an operation intended by a user is performed even when an orientation of the apparatus changes while a touch panel is being touched.

According to an aspect of the present disclosure, an electronic apparatus includes a touch detection unit configured to detect a touch on a display unit, an orientation detection unit configured to detect an orientation of the electronic apparatus, a display control unit configured to perform control to change a display position of a display item displayed on the display unit if a predetermined change of the orientation of the electronic apparatus is detected by the orientation detection unit, and a control unit configured to perform control so that, if the predetermined change of the orientation of the electronic apparatus occurs, processing based on a touch operation of a touch that has been detected by the touch detection unit since before the predetermined change occurs is not performed.

An exemplary embodiment of the present disclosure can increase the possibility that an operation intended by a user is performed even when an orientation of the apparatus changes while a touch panel is being touched.

Further features of the present disclosure will become apparent from the following description of exemplary embodiments with reference to the attached drawings.

BRIEF DESCRIPTION OF THE DRAWINGS

FIGS. 3A, 3B, 3C, 3D, 3E, and 3F illustrate display examples in a photographing mode.

DESCRIPTION OF THE EMBODIMENTS

An exemplary embodiment of the present disclosure will be described in detail below with reference to the accompanying drawings. It is to be noted that the following exemplary embodiment is merely one example for implementing the present invention and can be appropriately modified or changed depending on individual constructions and various conditions of apparatuses to which the present disclosure is applied. Thus, the present disclosure is in no way limited to the following exemplary embodiment.

Figure 1A:
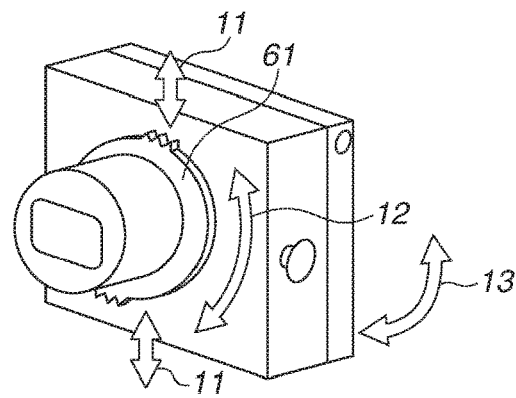
FIGS. 1A, 1B, and 1C are outer views of a digital camera according to an exemplary embodiment of the present disclosure.
Figure 1B:
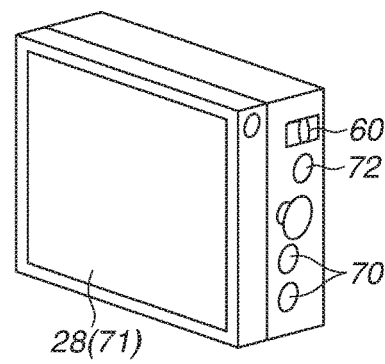
Figure 1C:
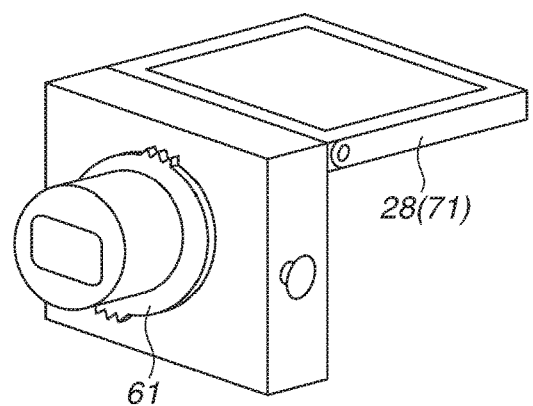

FIGS. 1A to 1C are outer views of a digital camera as an example of an electronic apparatus according to an exemplary embodiment of the present disclosure. FIG. 1A is a front perspective view of a digital camera 100. FIG. 1B is a rear perspective view of the digital camera 100 in a state where a tilt display unit 28 is closed. FIG. 1C is a front perspective view of the digital camera 100 in a state where the tilt display unit 28 is opened. The display unit 28, on which an image and various types of information are displayed, is integrally formed with a touch panel 71 in an operation unit 70. A shutter operation unit 61, through which a photographing instruction is given, is operable to slide in a direction indicated by arrows 11 orthogonal to a lens optical axis. Half and full pressing operations in upper and lower directions can be performed on the shutter operation unit 61. As used herein, the term "unit" generally refers to any combination of software, firmware, hardware, or other component that is used to effectuate a purpose.

For example, the shutter operation unit 61 can be pressed to slide downward in a direction of the arrow 11 to an intermediate position to achieve a half pressed state. The shutter operation unit 61 can be further pressed downward to achieve a full pressed state. The half and full pressing can be also performed upward. Then, when the shutter operation unit 61 is not touched, the shutter operation unit 61 is at an initial position that is none of upward and downward half and full pressed states. The shutter operation unit 61 can also be operated to rotate about the lens optical axis in a direction indicated by an arrow 12. This rotating operation enables optical zooming and electronic zooming in which the zoom lens is driven. Thus, the shutter operation unit 61 has the function of instructing photographing and also has the function as a zoom lever.

A mode change switch 60 is an operation unit with which a mode is set through switching among various modes. An operation unit 70 includes operation members such as various switches and buttons, and a touch panel that receives various operations from a user. A power switch 72 is a push button, with which power is turned ON and OFF. The display unit 28 including the touch panel 71 can be opened and closed in directions indicated by an arrow 13 with respect to a main body portion. The display unit 28 can be opened by 90° at the maximum with the display surface facing upward as illustrated in FIG. 1C. When the display unit 28 is opened as illustrated in FIG. 1C, and the digital camera is held low, the display unit 28, on which a through image (live view image) is displayed, can be viewed from above. Thus, low angle photographing can be easily performed. When the digital camera 100 is flipped upside down from the state illustrated in FIG. 1C and held high, the display unit 28 can be viewed from below. Thus, high angle photographing can be easily performed.

Figure 2:
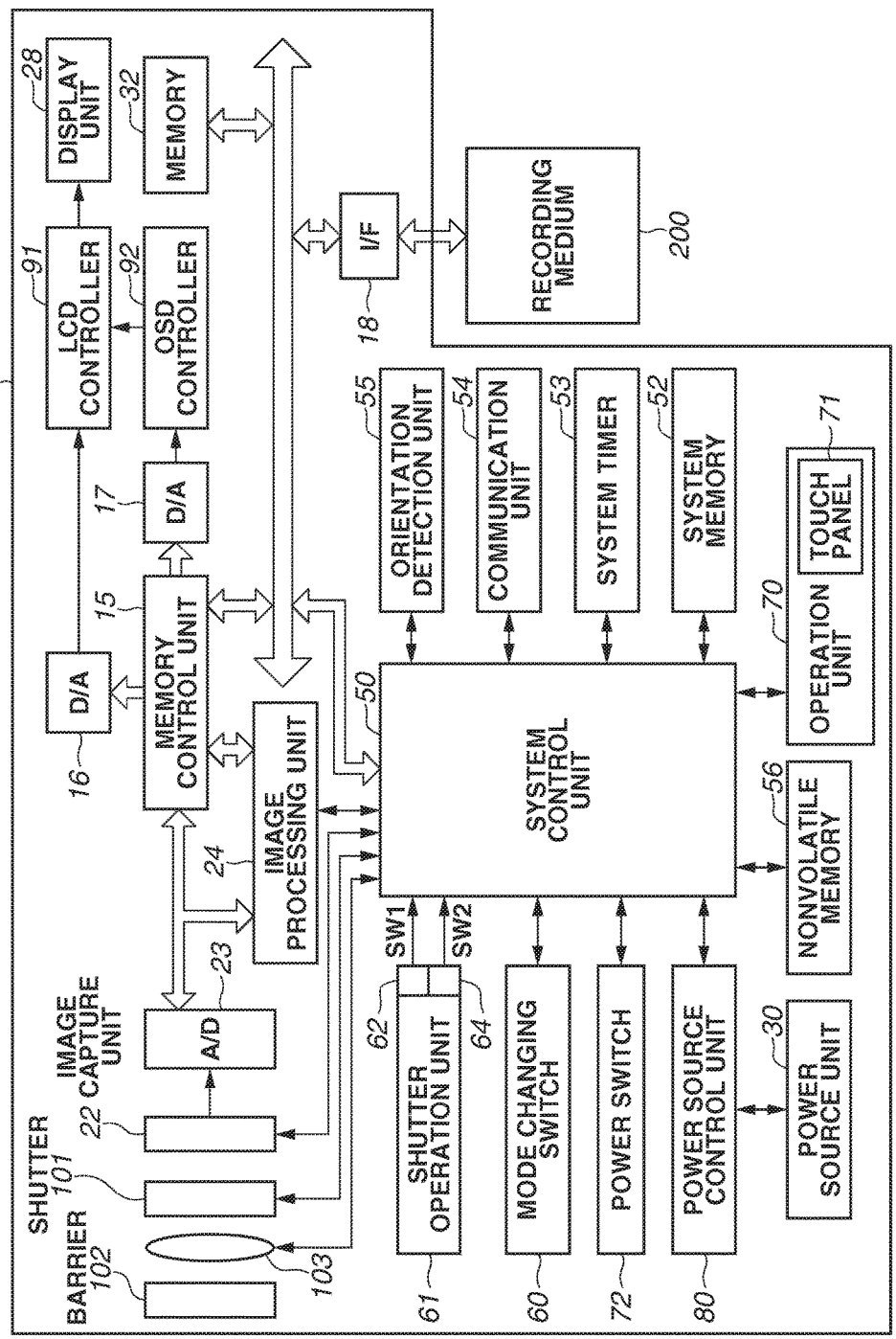
FIG. 2 is a schematic configuration block diagram of the digital camera according to the exemplary embodiment of the present disclosure.

FIG. 2 is a block diagram exemplarily illustrating a configuration of the digital camera 100 according to the exemplary embodiment.

The following components are illustrated in FIG. 2. A photographing lens 103 is a lens group including a zoom lens and a focus lens. A shutter 101 has a diaphragm function. An image capture unit 22 is an image sensor including a complementary metal oxide semiconductor (CMOS) element or a charge-coupled device (CCD), by which an optical image is converted into an electrical signal. An analog/digital (A/D) converter 23, which converts an analog signal into a digital signal, is used for converting an analog signal output from the image capture unit 22 into a digital signal. A barrier 102 covers an image capture system including the photographing lens 103 of the digital camera 100, thereby preventing the image capture system including the photographing lens 103, the shutter 101, and the image capture unit 22 from being soiled and damaged.

An image processing unit 24 performs a predetermined pixel interpolation, resizing processing such as reduction, and color conversion processing on data from the A/D converter 23 or from a memory control unit 15. In the image processing unit 24, a predetermined calculation processing is performed with captured image data. A system control unit 50 performs exposure control and distance measurement control based on the calculation result thus obtained. Thus, through the lens (TTL) automatic focusing (AF) processing, automatic exposing (AE) processing, and pre-flash (EE) processing are performed. In the image processing unit, predetermined calculation processing is performed with captured image data and TTL auto white balance (AWB) processing is further performed based on the calculation result thus obtained.

Output data from the A/D converter 23 is written into a memory 32 via the image processing unit 24 and the memory control unit 15, or directly via the memory control unit 15. The memory 32 stores therein image data obtained by the image capture unit 22 and converted into digital data by the A/D converter 23 and image data to be displayed on the display unit 28. The memory 32 has enough storage capacity to store therein a predetermined number of still images as well as moving images and sounds of a predetermined length.

The memory 32 also serves as a memory (video memory) for image display. A digital/analog (D/A) converter 16 converts the data (image data of a captured image such as a through image) to be displayed stored in the memory 32 into an analog signal and supplies the analog signal to a liquid crystal display (LCD) controller 91. A D/A converter 17 converts a displayed item (on screen display (OSD)) such as display data for displaying a touch icon, a touch button, and information into an analog signal and supplies the analog signal to an OSD controller 92. The OSD controller 92 flips the displayed item (OSD) vertically and horizontally (or rotates the OSD by 180°) when the orientation of the digital camera 100 is detected to be upside down based on the detection by an orientation detection unit 55 to be supplied to the LCD controller 91, if the orientation is not upside down, the OSD controller 92 supplies the non-flipped OSD to the LCD controller 91. The LCD controller 91 superimposes (combines) the data on the displayed item supplied from the OSD controller 92 with the image data supplied from the D/A converter 16, and supplies the resultant data to the display unit 28. Thus, the image data to be displayed written in the memory 32 is displayed on the display unit. 28 via the D/A converter 16. The display unit 28 performs display corresponding to a signal from the LCD controller 91 on a display device such as an LCD. The digital signals subjected to A/D conversion in the A/D converter 23 and accumulated in the memory 32 are subjected to analog conversion in the D/A converter 16, and are sequentially transmitted to the display unit 28 to be displayed. Thus, the apparatus functions as an electronic viewfinder, and the through image display (live view display) can be performed.

A nonvolatile memory 56 is an electrically erasable and recordable memory and can be an Electrically Erasable Programmable Read-Only Memory (EEPROM), for example. The nonvolatile memory 56 stores therein constants, programs, and the like for operating the system control unit 50. The programs herein are used for executing various flowcharts described later in the exemplary embodiment.

The system control unit. 50 controls the entire digital camera 100. Each processing of the exemplary embodiment to be described later is implemented by executing a program recorded in the nonvolatile memory 56 described above. A system memory 52 is a random access memory (RAM) into which a constant, a variant, a program read from the nonvolatile memory 56 and the like used for operating the system control unit 50 are loaded. The system control unit 50 also performs display control by controlling the memory 32, the D/A converter 16, the D/A converter 17, the LCD controller 91, the OSD controller 92, the display unit 28, and the like.

A system timer 53 is a time measurement unit that measures a time used for various controls, and a time on an internal clock.

The mode change switch 60 and the operation unit 70 are operation units that input various operation instructions to the system control unit 50.

An operation mode of the system control unit 50 is switched among a still image photographing mode, a moving image photographing mode, a playback mode, and the like via the mode change switch 60. The still image photographing mode includes modes such as an auto photographing mode, an auto scene determining mode, a manual mode, various scene modes as photographing settings for respective captured scenes, a program AE mode, and a custom mode. With the mode change switch 60, the operation mode is directly switched to one of these modes in the still image photographing mode. Alternatively, after switching the operation mode of the digital camera to the still image photographing mode with the mode change switch 60, the operation mode may be switched to one of the mode in the still image recording mode with another operation member (photographing mode switching). Similarly, the moving image photographing mode may include a plurality of modes. A first shutter switch 62 is turned ON so that a first shutter switch signal SW1 is generated when the shutter operation unit 61 provided to the digital camera 100 is half way operated and thus a half pressed state (photographing preparation instruction) is achieved. The first shutter switch signal SW1 triggers operations such as the AF processing, the AE processing, the AWB processing, and the EE processing.

A second shutter switch 64 is turned ON so that a second shutter switch signal SW2 is generated when the shutter operation unit 61 is fully operated and thus a full pressed state (photographing instruction) is achieved. The second shutter switch signal SW2 triggers a series of photographing processing operations from reading of a signal from the image capture unit 22 to writing of image data into a recording medium 200.

Operation members of the operation unit 70 are allocated with functions suitable for each scene through a selection operation on various function icons displayed on the display unit 28, and function as various function buttons. The function buttons include, for example, an end button, a return button, an image advancement button, a jump button, an aperture reduction button, an attribute change button, and the like. For example, a menu screen via which various setting can be made is displayed on the display unit 28 when the menu button is pressed.

A power source control unit 80 includes a battery detection circuit, a direct current (DC)-to-DC converter, a switch circuit that switches a block to be energized, and the like, and detects whether a battery is mounted, the type of the battery, and remaining battery. The power source control unit 80 controls the DC-to-DC converter based on a result of the detection and an instruction from the system control unit 50 so that units including the recording medium 200 are provided with an appropriate voltage for an appropriate period of time.

A power source unit 30 is a primary battery such as an alkaline battery and a lithium battery, a secondary battery such as a nickel-cadmium (NiCd) battery, a nickel metal hydride (NiMH) battery, and a lithium-ion (Li) battery, an alternate current (AC) adapter, or the like. A recording medium I/F 18 is an interface between the digital camera 100 and the recording medium 200 such as a memory card and a hard disk. The recording medium 200 is a recording medium such as a memory card that records a captured image, and is a semiconductor memory, a magnetic disk, or the like.

A communication unit 54 connects the digital camera 100 with an external entity wirelessly or via a wired cable, and transmits and receives an image signal and a sound signal. The communication unit 54 can be connected to a wireless local area network (LAN) and the Internet. The communication unit 54 can transmit an image (including a through image) captured by the image capture unit 22 and an image recorded on the recording medium 200. The communication unit 54 can receive image data and other various pieces of information from an external apparatus.

The orientation detection unit 55 detects an orientation of the digital camera 100 with respect to the direction of gravitational force. Based on the orientation detected by the orientation detection unit 55, an image captured by the image capture unit 22 can be determined to be an image captured with the digital camera 100 held horizontally or vertically. Furthermore, whether the digital camera is held at a normal position or held upside down from the regular position with respect to the direction of gravitational force can be determined. The system controller can add orientation information corresponding to the orientation detected by the orientation detection unit 55 to an image file of an image captured by the image capture unit 22, and rotate the image to be recorded. The orientation detection unit 55 may be an acceleration sensor, a gyro sensor, or the like.

The operation unit 70 includes the touch panel 71 that can detect a contact on the display unit 28 (can detect touch). The touch panel 71 and the display unit 28 may be integrally formed. For example, the touch panel 71 having a transmittance set to such a level that the display on the display unit 28 is not hindered may be attached on an upper layer of a display surface of the display unit 28. Here, input coordinates of the touch panel 71 are associated with display coordinates on the display unit 28. Thus, graphical user interface (GUI) can be formed that can make a user feel as if he or she can directly operate a screen displayed on the display unit 28. The system control unit 60 can detect the following operations or states on or of the touch panel 71.

Operation (state) in which the touch panel 71 is touched by a finger or a pen (hereinafter referred to as Touch-Down).

Operation (state) in which the touch panel 71 is being touched by the finger or the pen (hereinafter referred to as Touch-On).

Operation (state) in which the finger or the pen touching the touch panel 71 moves (hereinafter referred to as Touch-Move).

Operation (state) in which the finger or the pen that has been touching the touch panel 71 is separated from the touch panel 71 (hereinafter referred to as Touch-Up).

State in which nothing is touching the touch panel 71 (hereinafter referred to as Touch-Off).

The system control unit 50 is notified of the operation/state as well as coordinates of a position at which a finger or a pen is touching the touch panel 71 via an internal bus, and determines what kind of operation is performed on the touch panel 71 based on the notified information. When the Touch-Move is performed, a direction in which the finger or the pen moves on the touch panel 71 can be determined in units of vertical and horizontal components on the touch panel 71 based on the change in the position coordinates. It is determined that a stroke is drawn when Touch-Down, a certain Touch-Move, and Touch-Up are sequentially performed on the touch panel 71. An operation of rapidly drawing a stroke is called flicking. The flicking is performed by rapidly moving a finger touching the touch panel 71 for a certain distance and then separating the finger. In other words, the flicking is an operation of rapidly tracing the touch panel 71 with a finger. It is determined that the flicking is performed when Touch-Move of a predetermined distance or more at a predetermined speed or faster is detected and then Touch-Up is detected. It is determined that dragging is performed when Touch-Move of the predetermined distance or more at a speed slower than the predetermined speed is detected. The touch panel 71 may be any one of various touch panels such as a resistive touch panel, an electrostatic capacitance touch panel, a surface acoustic wave touch panel, and infrared touch panel, an electromagnetic induction touch panel, an image recognition touch panel, and an optical sensor touch panel.

Processing corresponding to a touch operation in accordance with an orientation during a photographing mode is described in the exemplary embodiment, normally, when the orientation of the digital camera 100 is flipped upside down while the touch panel 71 is being touched under the photographing mode, the display of displayed items is flipped, and a touch operation performed at that point is invalidated. However, when the orientation of the digital camera 100 is flipped upside down while the touch panel 71 is being touched and a touch shutter operation is executed (a state where Touch-Up triggers the photographing), the display of displayed items is not flipped, and a touch operation performed at that point is valid. In other words, while the touch shutter operation is executed, Touch-Up triggers the photographing even when the orientation of the digital camera 100 is flipped upside down during then. The touch shutter operation is a function of performing a photographing preparation operation such as AF and AE upon detecting Touch-Down in an area in the touch panel 71 in which the through image (live view image) is displayed, and in accordance with the touched position, and performing the photographing in response to Touch-Up.

FIGS. 3A to 3F illustrate examples of displays on the display unit 28 in the photographing mode of the exemplary embodiment.

FIG. 3A is a rear view of the digital camera 100 at the normal position when the touch panel 71 is not touched during photographing standby in the photographing mode. An arrow A pointing the upper direction of the digital camera 100 is provided since whether the digital camera is at the normal position or the upside down position is difficult to determine only from a form of the digital camera 100. The direction pointed by the arrow A is defined as the upper direction of the digital camera 100 at the normal position. On the display unit 28, photographing condition (photographing setting) information 302 and various touch buttons 303 to 307 as the OSD (display items) are superimposed on a through image 301. The photographing condition information 302 is a display indicating the current setting and state of the digital camera 100. Specifically, in the photographing condition information 302, remaining battery, recorded image quality (compression rate and image size), and the remaining number of photographable images are arranged in this order starting on the left side. The touch buttons 303 to 307 are each a touch item for executing a function allocated thereto upon detecting Touch-Up at the position thereof. For example, the touch-button 307 is a menu button, and if Touch-Up at its position is detected, a menu screen opens.

FIG. 3B is a rear view of the digital camera 100 at an upside down position (with the orientation flipped from that of the normal position), the touch panel 71 is not touched and in photographing standby under the photographing mode. The display positions and orientations of the photographing condition information 302 and the touch buttons 303 to 307 as the ODS are flipped vertically and horizontally with respect to the upper direction of the digital camera 100 indicated by the arrow A. Thus, the display positions and orientations of the photographing condition information 302 and the touch buttons 303 to 307 are the same as those in the normal position as viewed from the user, and thus the digital camera 100 can be operated easily. As the through image 301, an image captured at the point is displayed without being flipped. Thus, the orientation of an object as viewed from the user when the digital camera 100 is at the upside down position is the same as that in the case where the digital camera 100 is at the normal position.

FIG. 3C illustrates an example of a display where the camera is at the normal position and the through image is touched by a finger F during the photographing standby under the photographing mode. Here, the touch shutter operation is halfway through, and an autofocus (AF) frame 310 is displayed on an object at a position on which Touch-Down is performed. AF is performed by tracking the object at the position where the AF frame 310 is provided based on amounts of characteristics such as a color, contrast, and the like of the through image 301 (that is, correlation between frames of the through image as a moving image). The camera is in standby where the photographing is not performed until Touch-Up is performed.

FIG. 3D illustrates an example of a display in a case where the orientation of the digital camera 100 is changed (flipped) to the upside down position without changing the touched position of the finger F from that in FIG. 3C. Here, unlike in the case of FIG. 3B, the display positions and orientations of the photographing condition information 302 and the touch buttons 303 to 307 are unchanged even though the orientation of the digital camera 100 is flipped upside down. Thus, the positions and orientations of the photographing condition information 302 and the touch buttons 303 to 307 are upside down as viewed from the user, and the touch is valid. Thus, the user can recognize that the current touch operation started when the camera is at the normal position (state illustrated in FIG. 3C) is still valid and that Touch-Up will trigger the photographing. As described above, the touch operation in the course of a photographing operation is still valid even when the orientation of the digital camera 100 changes. All things considered, a risk of missing the shot due to an unintended cancellation of the touch operation in the course of the photographing operation can be reduced.

FIG. 3E illustrates an example of a display provided when the touch button 307 is touched by the finger F while the camera is at the normal position and in photographing standby under the photographing mode. The touch button 307 is displayed in a display mode with a color or the like being different from that in the Touch-Off state. A function allocated to the touch button 307 is executed (menu screen is opened) when Touch-Up of the finger F is performed in this state.

FIG. 3F illustrates an example of a display provided when the finger F is touching the touch panel 71 and the orientation of the digital camera 100 is changed (flipped) to the upside down position with the touched position remaining unchanged. Here, the display positions and orientations of the photographing condition information 302 and the touch buttons 303 to 307 as the OSD are flipped vertically and horizontally as in FIG. 3B. The current touch operation that has started before the orientation is changed is invalidated and the function to be triggered by Touch-Up is not executed. Furthermore, the display mode of the touch button returns to that in the Touch-off state. Since the current touch started before the orientation is changed is invalidated, processing corresponding to a position (around a portion where the photographing condition information 302 is displayed after the orientation is changed) touched after the orientation is changed is not executed. When the touch is released and then again performed, processing corresponding to a touched position is executed.

Next, processing corresponding to a touch operation corresponding to an orientation of the camera while the menu screen is displayed as an example of an operation state other than the photographing mode is described in the exemplary embodiment, when the orientation of the digital camera is flipped upside down while the touch operation is performed, the display of the displayed items is flipped and a touch operation performed at that point is completely invalidated. Thus, when the orientation of the digital camera is flipped upside down while touch is performed thereon, processing corresponding to Touch-Move, Touch-Up, Long-Touch, or the like is not performed unless the touch is released.

FIGS. 4A to 4D each illustrate examples of a display under a menu screen display mode related to a photographing setting in the exemplary embodiment.

Figure 4A:
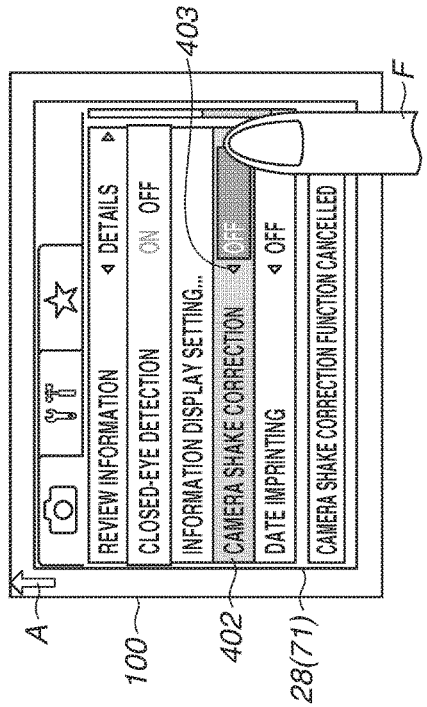
FIGS. 4A, 4B, 4C, and 4D illustrate display examples of a menu screen.
Figure 4B:
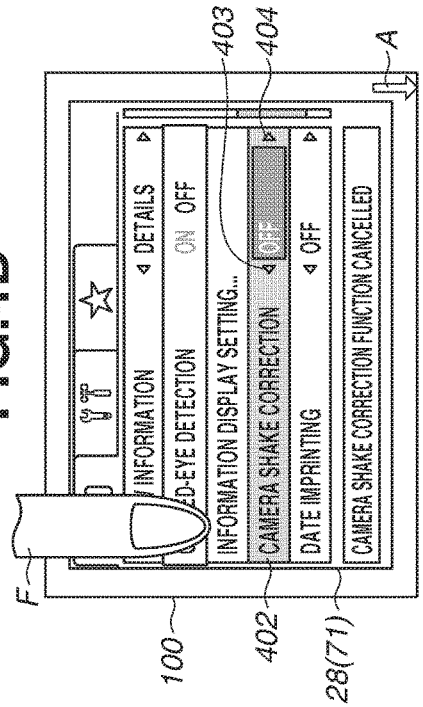

FIG. 4A illustrates a menu screen, and is a rear view of the digital camera 100 at the normal position when the touch panel 71 is not touched. In the menu screen, a plurality of menu items as setting items related to photographing are vertically arranged, and in the figure, a menu item. 401 is selected. The menu item 401 is cursor displayed by being provided with a color different from those of the other menu items to show that the item is selected. In the menu screen, when any of the plurality of displayed menu screens is touched, the touched menu item can be selected, and the cursor can be moved to the selected item. By touching a setting area on the right, side of the selected menu item (indicated by the cursor), the setting of the item can be changed. Through Touch-Move in a vertical direction, the screen can be scrolled so that the rest of the menu items that has not been able to be displayed in a single screen can be displayed. No particular function is allocated to Touch-Move in a horizontal direction.

FIG. 45 illustrates a state where the camera is at the normal position, and a menu item 402 touched and thus is selected. The setting on the menu item 402 can be changed by touching an up/down button (down button 403 or up button 404) displayed in a setting area on the right side of the menu item 402 in this state. The setting value can be continuously changed through key repeat while the up/down button is being touched. For example, in the illustrated example, Touch-Down on the up button 404 switches "camera shake correction" from "ON" to "OFF". If the user keeps touching the position of the up button 404, the "camera shake correction" switches between "ON" and "OFF" at every predetermined time, and the setting selected at the point when Touch-Up is performed is set.

Figure 4C:
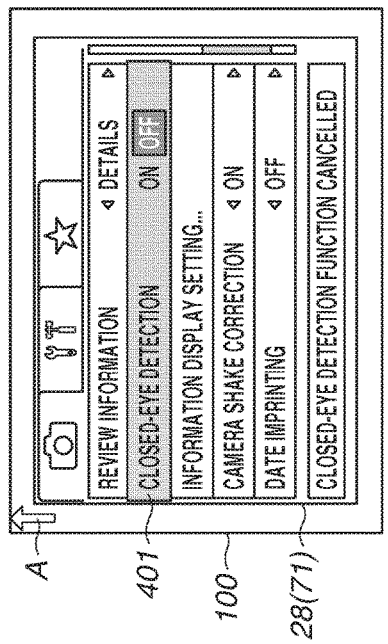

FIG. 4C illustrates an example of a display provided when the camera is at the normal position, the menu item 402 is selected, and the up button 404 is touched. The setting of "camera shake correction" is switched to "OFF" unlike in the state illustrated in FIG. 4B. It is to be noted that the figure only illustrates a display mode at a certain moment, and if the user keeps touching the position, the setting switches between "ON" and "OFF" at every predetermined time as described above.

Figure 4D:
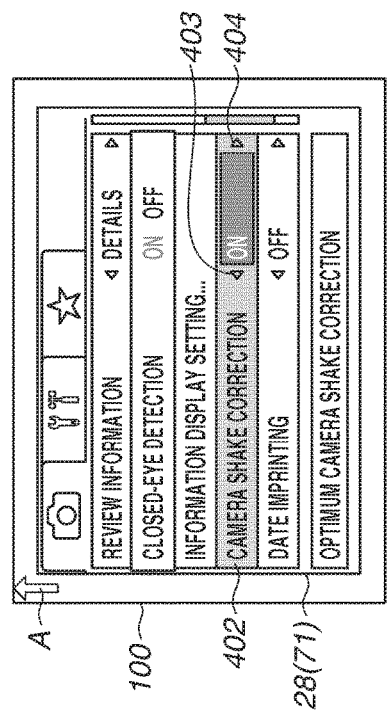

FIG. 4D illustrates an example of a display provided when the orientation of the camera is changed to the upside down position while the finger F is touching the same touched position as that in FIG. 4C. Thus, the arrow A is pointing downward. The menu screen as the display item is displayed while being vertically and horizontally flipped from that in FIG. 4C. Still, the orientation of the digital camera 100 is flipped upside down, and thus the orientation of the menu screen is the same between FIG. 4C and FIG. 4D as viewed from the user. The touch operation at the point when the orientation of the digital camera 100 is flipped is invalidated, and thus the switching between the "ON" and "OFF" of "camera shake correction" stops when the orientation of the digital camera 100 is flipped, and the setting is not switched even when the user keeps touching the button thereafter. The finger F is touching a display position of a menu item different from the menu item 402 since the display of the menu screen is flipped in response to the flipping of the orientation. Still, the selection is not changed (cursor position does not move) because the touch that has been going on since before the orientation was changed is invalidated. Furthermore, Touch-Move performed in this state does not cause scrolling. When the touch is released, and then. Touch Down is performed again, the touch is valid.

Processing flowcharts for implementing the operations described above are described.

Figure 5B:
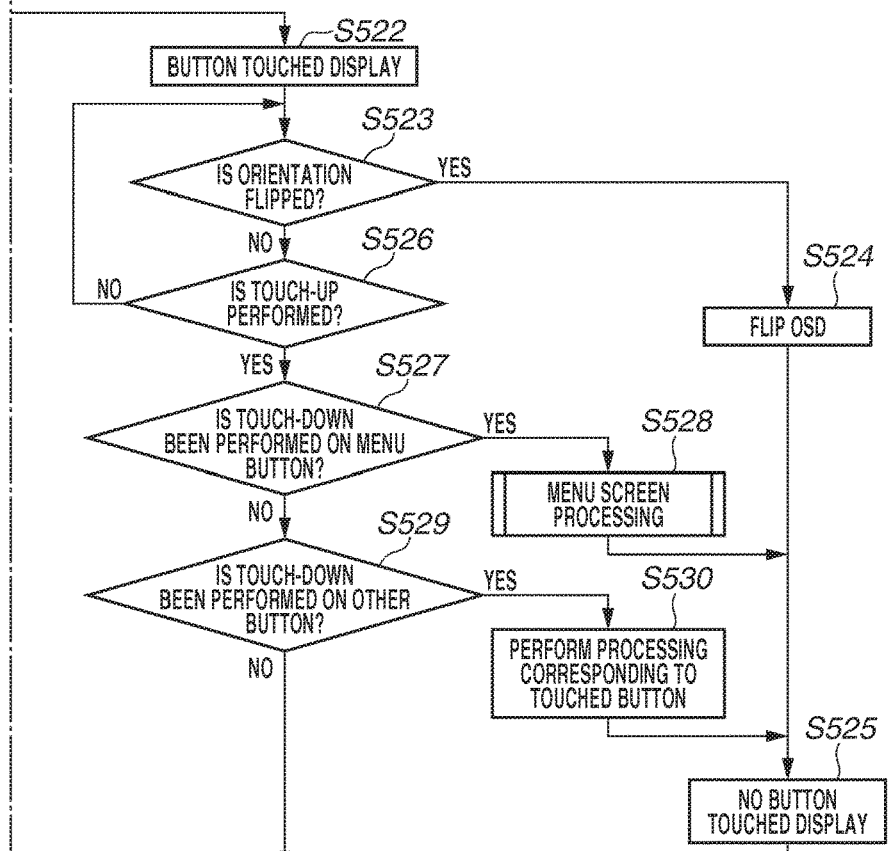
FIG. 5, which is composed of FIGS. 5A and 5B, is a flowchart of photographing processing.

FIG. 5, which is composed of FIGS. 5A and 5B, illustrates a flowchart of the photographing mode processing according to the exemplary embodiment. The processing is implemented when a program recorded in the nonvolatile memory 56 is loaded into the system memory 52 and executed by the system control unit 50. The photographing mode in FIG. 5 starts when the still image photographing mode is selected via the mode change switch 60 to be activated.

In step S501, the system control unit 50 starts the photographing by the image capture unit 22, and provides the through display on the display unit 28. FIG. 3A described above illustrates the display at this point.

In step S502, the system control unit 50 determines whether the orientation of the digital camera 100 (or the touch panel 71) is flipped upside down based on an output from the orientation detection unit 55. For example, it is determined that the orientation is flipped upside down when one of the regular position and the upside down position defined as follows changes to the other.

Normal position: an orientation in which vertical and depth axes of the digital camera 100 are within a predetermined angle range with respect to those in an orientation in which the upside direction (pointed by the arrow A described above) is opposite (straight upper direction) to the direction of gravitational force.

Upside down position: an orientation in which vertical and depth axes of the digital camera 100 are within a predetermined angle range with respect to those in an orientation in which the upside direction (pointed by the arrow A described above) is in (straight lower direction) the direction of gravitational force.

Exactly vertically flipped positional relationship is a positional relationship between two images where one of the images is rotated by 180° about an axis orthogonal to the display surface of the display unit 28 (touch panel 71) with respect to the other. In the following description, whether the orientation of the digital camera 100 is flipped upside down is determined based on the standard described above. The processing proceeds to step S503 if the orientation of the digital camera 100 is flipped upside down, and proceeds to step S504 if the orientation is not flipped upside down.

In step S503, the system control unit 50 controls the OSD controller 92 so that the display of the OSD (the photographing condition information 302 and the touch buttons 303 to 307) on the display unit 28 is flipped vertically and horizontally. Thus, when the orientation changes from the normal position to the upside down position, the display changes from that in FIG. 3A to that in FIG. 3B.

In step S504, the system control unit. 50 determines whether Touch-Down is performed. The processing proceeds to step S513 when Touch-Down is performed, and proceeds to step S505 when Touch-Down is not performed.

In step S505, the system control unit 50 determines whether SW1 is turned ON by the half pressing operation on the shutter control unit 61. The processing proceeds to step S506 when SW1 is turned ON, and proceeds to step S510 when SW1 is OFF.

In step S506, the system control unit 50 performs photographing preparation operation such as AF and AE.

In step S507, the system control unit 50 determines whether SW2 is turned ON by the full pressing operation on the shutter control unit 61. The processing proceeds to step S508 when SW2 is turned ON, and proceeds to step 3509 when SW2 is OFF.

In step S509 the system control unit 50 performs a series of processing to record an image captured by the image capture unit 22 on the recording unit 200 as an image file. The processing herein is referred to as main photographing processing (photographing control) so as to be distinguished from the photographing for the through image.

In step S509, the system control unit 50 determines whether SW1 is still ON. The processing returns to step 3507 when SW1 is (still) ON, and proceeds to step S510 when SW1 is OFF (is not still ON).

In step S510 the system control unit 50 determines whether another operation has been performed. The other operation includes a zooming operation based on a rotational operation on the shutter operation unit 61. When the other operation is performed, the processing proceeds to step S511 where the system control unit 50 performs processing corresponding to the performed operation. The processing proceeds to step S512 when no such operation has been performed.

In step S512, the system control unit 50 determines whether there has been an event that terminates the photographing mode such as power OFF, 0 remaining battery, and transition to the playback mode. The photographing mode processing is terminated if there has been the terminating event, and returns to step S501 to be repeated if no such event has occurred.

When Touch-Down is performed in step S504, the system control unit 50 determines, in step S513, whether the touched position of Touch-Down is in a button area of any of the touch buttons 303 to 307. The processing proceeds to step S522 when Touch-Down is performed in the button area, and proceeds to step S514 if Touch-Down is not performed in the button area.

In step S514, the system control unit. 50 determines whether the touched position of Touch-Down is in a touch shutter operable area. It is assumed here that the touch shutter operable area is portion in which the OSD is not displayed in an area where the through image is displayed.

The processing proceeds to step S515 if Touch-Down is performed in the touch shutter operable area, and proceeds to step S518 if Touch-Down is not performed in the touch shutter operable area.

In step S515, the system control unit 50 displays the AP frame 310 based on the position on which Touch-Down is performed. As a result, the AF frame 310 described with reference to FIG. 3C is displayed.

In step S516, the system control unit 50 performs AF at a position where the AF frame 310 is provided, and also performs another photographing preparation operation such as AE.

In step S517, the system control unit 50 determines whether Touch-Up is performed. If Touch-Up is performed, the processing proceeds to step S508 where the system control unit 50 performs the main photographing processing, and if Touch-Up is not performed, the system control unit 50 waits for Touch-Up in step S517. When Touch-Down is performed in the touch shutter operable area in step S514, the display items (OSD) is not displayed in a flipped manner in accordance with the orientation of the digital camera 100, and the touch that has been continuously performed valid unless Touch-Up is detected in step S517. Thus, the risk can be reduced that the user waiting for a photo opportunity in a Touch-On state in the course of the touch shutter operation is suddenly disabled to perform photographing by Touch-Up due to the change in the orientation and thus misses the shot.

In step S518, the system control unit. 50 determines whether Move-In is performed to a button area of any of the touch buttons 303 to 307 (the movement of the touched position from another position through Touch-Move). The processing proceeds to step S522 if Move-In to the button area is performed, and proceeds to step S519 if Move-In is not performed.

In step S519, the system control unit 50 determines whether the orientation of the digital camera is flipped upside down. If the orientation is flipped upside down, the processing proceeds to step S520 where the system control unit 50 flips the OSD vertically and horizontally to be displayed and then the processing proceeds to step S512. When the orientation is not flipped upside down, the processing proceeds to step S521 where the system control unit 50 waits for Touch-Up. The processing returns to step S518 if no Touch-Up is performed, and proceeds to step S512 if Touch-UP is performed.

In step S522, since the button area is touched, the system control unit 50 changes the display mode of the button at the touched position to that indicating that the button is touched. Thus, the display mode is changed to that of the touch button 307 illustrated in FIG. 3E, and thus the user can recognize the button he or she is touching.

In step S523, the system control unit. 50 determines whether the orientation of the digital camera 100 is flipped upside down. The processing proceeds to step S524 if the orientation is flipped upside down, and proceeds to step S523 if the orientation is not flipped upside down.

In step S524, the system control unit 50 flips the OSD vertically and horizontally to be displayed. Then, the processing proceeds to step S525 where the system control unit 50 resets the display modes of all the touch buttons to those in a non-touched state. This is a case where the orientation of the digital camera 100 is flipped upside down while the touch button is being touched, and the display mode illustrated in FIG. 3F described above is achieved. Thus, the touch that has been continuously performed since before the orientation was flipped upside down is invalidated, and the function of the touch button that has been touched is not executed. Moreover, even when the continuous touch is released by Touch-Up, the function of the touch button at the Touch-Up position is not executed.

In step S526, the system control unit 50 determines whether Touch-Up is performed. The processing proceeds to step S527 if Touch-Up is performed, and returns to step S523 if Touch-Up is not performed.

In step S527, the system control unit 50 determines whether the position last touched before Touch-Up (hereinafter referred to as Touch-Up position) is on the touch button 307 as a menu button. If the Touch-Up position is on the menu button, the processing proceeds to step S528 where the system control unit 50 displays the menu screen. Menu screen processing in step S528 will be described below with reference to FIG. 6.

In step S529, the system control unit 50 determines whether the Touch-Up position is at a position of a touch button other than the touch button 307. The processing proceeds to step S530 if the Touch-Up position is at the position of the other touch button, and proceeds to step S532 if the Touch-Up position is not at the position of the other touch button.

The system control unit 50 executes the function allocated to the touch button at the Touch-Up position in step S530, and resets the display modes of all the touch buttons to those in photographing standby display in the non-touched state. Then, the processing proceeds to step S512.

Figure 6B:
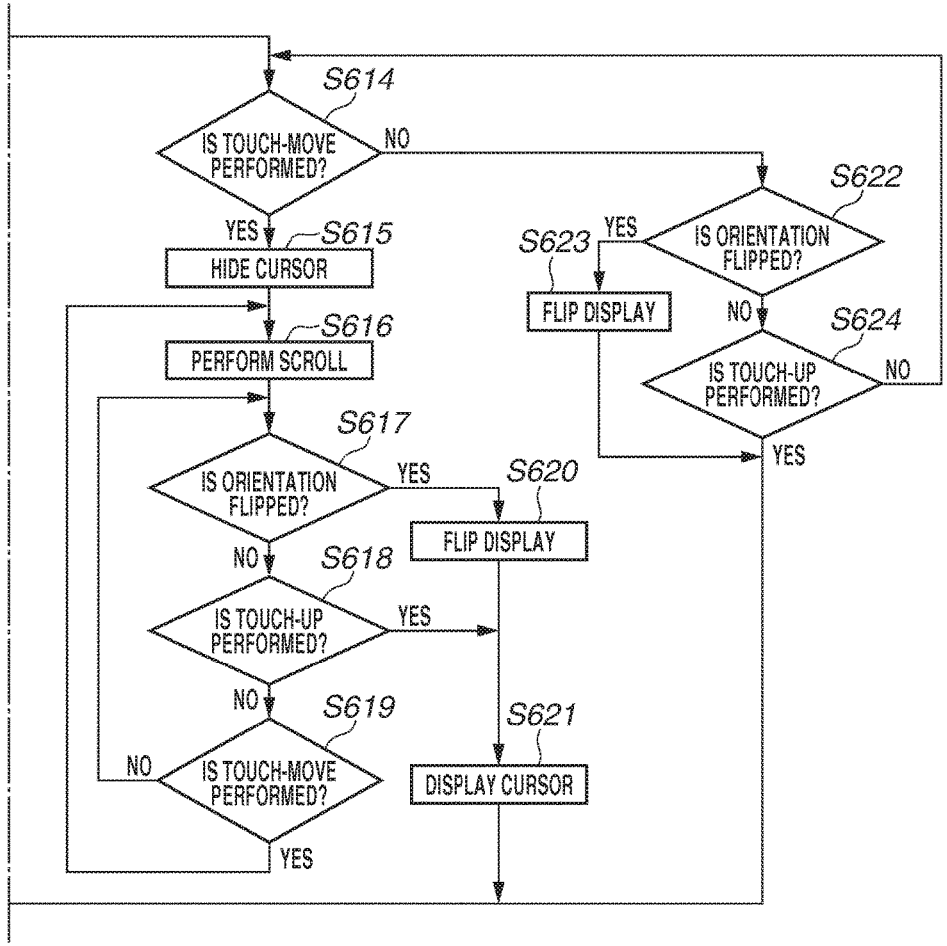
FIG. 6, which is composed of FIGS. 6A and 6B, is a flowchart of menu screen processing.

FIG. 6, which is composed of FIGS. 6A and 6B, illustrates a flowchart of the menu screen processing in the exemplary embodiment to describe the processing in step S528 in FIG. 5 in detail. The processing is implemented when a program recorded in the nonvolatile memory 56 is loaded into the system memory 52 and executed.

In step S601, the system control unit 50 displays the menu screen on the display unit 28. FIG. 4A illustrates the display example at this point.

In step S602, the system control unit 50 determines whether Touch-Down is performed. The processing proceeds to step S606 when Touch-Down is performed, and proceeds to step S603 when Touch-Down is not performed.

In step S603, the system control unit 50 determines whether the orientation of the digital camera is flipped upside down. The processing proceeds to step S604 if the orientation is flipped upside down, and proceeds to step S605 if the orientation is not flipped upside down.

In step S604, the system control unit 50 flips the display items (all of which are assumed to be the OSD) of the menu screen in accordance with the orientation of the digital camera 100, which has been flipped upside down.

In step S605, the system control unit 50 determines whether an operation to close (end) the menu screen has been performed. The processing proceeds to step S606 where the system control unit 50 terminates the processing if the operation of closing the menu screen has been performed, and returns to step S602 if such an operation is not performed.

If Touch-Down is performed in step S602, the system control unit 50 determines, in step S606, whether Touch-Down is performed on a non-selected item that is not one of a plurality of menu items displayed on the menu screen pointed by a cursor and thus is selected. The processing proceeds to step S613 if Touch-Down is performed on the non-selected item, and proceeds to step S607 if Touch-Down is not performed on the non-selected item.

In step S608, the system control unit 50 determines whether Touch-Down is performed on an up/down button of the menu item pointed by the cursor and thus is selected elected item). The processing proceeds to step S608 if Touch-Down is performed on the up/down button of the selected item, and proceeds to step S614 if Touch-Down is not performed on the up/down button.

In step S608, the system control unit 50 changes a setting value in accordance with the touched up/down button. For example, if the selected item is "camera shake correction", the display changes from that illustrated in FIG. 4B where "camera shake correction" is "ON" to that illustrated in FIG. 4C where "camera shake correction" is "OFF".

In step S609, the system control unit 50 determines whether the orientation of the digital camera is flipped upside down. The processing proceeds to step S610 where the system control unit 50 flips the display items (all of which are assumed to be the OSD) of the menu screen in accordance with the orientation of the digital camera 100, which has been flipped upside down if the orientation is flipped upside down, and proceeds to step S611 if the orientation is not flipped upside down.

In step S611, the system control unit 50 determines whether Touch-Up is performed. The processing proceeds to step S605 if Touch-Up is performed, and proceeds to step S612 if Touch-Up is not performed.

In step S612, the system control unit. 50 determines whether a predetermined time (about 300 msec) has passed since the setting value has just been changed in step S608. The processing returns to step S609 if the predetermined time has not passed, and returns to step S608 where the system control unit. 50 changes the setting value again if the predetermined time has passed. Thus, while the user is touching the up/down button, key repeat is performed at every predetermined time, and the setting value can be continuously changed in accordance with the period during which the touch is performed.

In step S613, the system control unit 50 moves the cursor to the non-selected item at the Touch-Down position, to put the non-selected item in a selected state.

In step S614, the system control unit 50 determines whether Touch-Move is performed. The processing proceeds to step S615 if Touch-Move is performed, and proceeds to step S623 if Touch-Move is not performed.

In step S615, the system control unit 50 hides the cursor so that a state where no menu item is selected is achieved.

In step S616, the system control unit 50 performs scrolling in accordance with the direction of Touch-Move. In the exemplary embodiment, the scrolling is performed based only on a movement, component (Y component) in a vertical direction. Thus, the displayed menu group is scrolled upward or downward so that other menu items that have not been able to be displayed in a single screen are displayed.

In step S617, the system control unit 50 determines whether the orientation of the digital camera is flipped upside down. The processing proceeds to step S620 if the orientation is flipped upside down, and proceeds to step S618 if the orientation is not flipped upside down.

In step S618, the system control unit. 50 determines whether Touch-Lip is performed. The processing proceeds to step S622 if Touch-Up is performed, and proceeds to step S619 if Touch-Up is not performed.

In step S619, the system control unit 50 determines whether Touch-Move is performed. The processing returns to step S616 where the system control unit 50 performs the scrolling if Touch-Move is performed, and returns to step S617 if Touch-Move is not performed.

In step S620, the system control unit. 50 vertically and horizontally flips the display items (all of which are assumed to the OSD) of the menu screen. Here, the touch at this point is invalidated, and scrolling is not performed thereafter by Touch-Move unless the touch is once released. Then, even if Touch-Up is not performed, the processing proceeds to step S621 where the system control unit 50 performs processing that is the same as that in a case where the system control unit 50 determines that Touch-Up is performed in step S618.

In step S621, the system control unit 50 puts one of the group of menu items newly displayed by the scrolling in a selected state, and displays the cursor. When the processing is to be triggered by Touch-Up, a menu item at the Touch-Up position may be selected.

In step S622, the system control unit 50 determines whether the orientation of the digital camera is flipped upside down. The processing proceeds to step S623 if the orientation is flipped upside down, and proceeds to step S624 if the orientation is not flipped upside down.

In step S623, the system control unit 50 vertically and horizontally flips the display items (all of which are assumed to be the OSD) of the menu screen in accordance with the orientation of the digital camera 100. Here, the touch performed at this point is invalidated, and scrolling is not performed thereafter by Touch-Move unless the touch is once released.

In step S624, the system control unit 50 determines whether Touch-Up is performed. The processing proceeds to step S605 if Touch-Up is performed, and returns to step S614 if Touch-Up is not performed.

Figure 7:
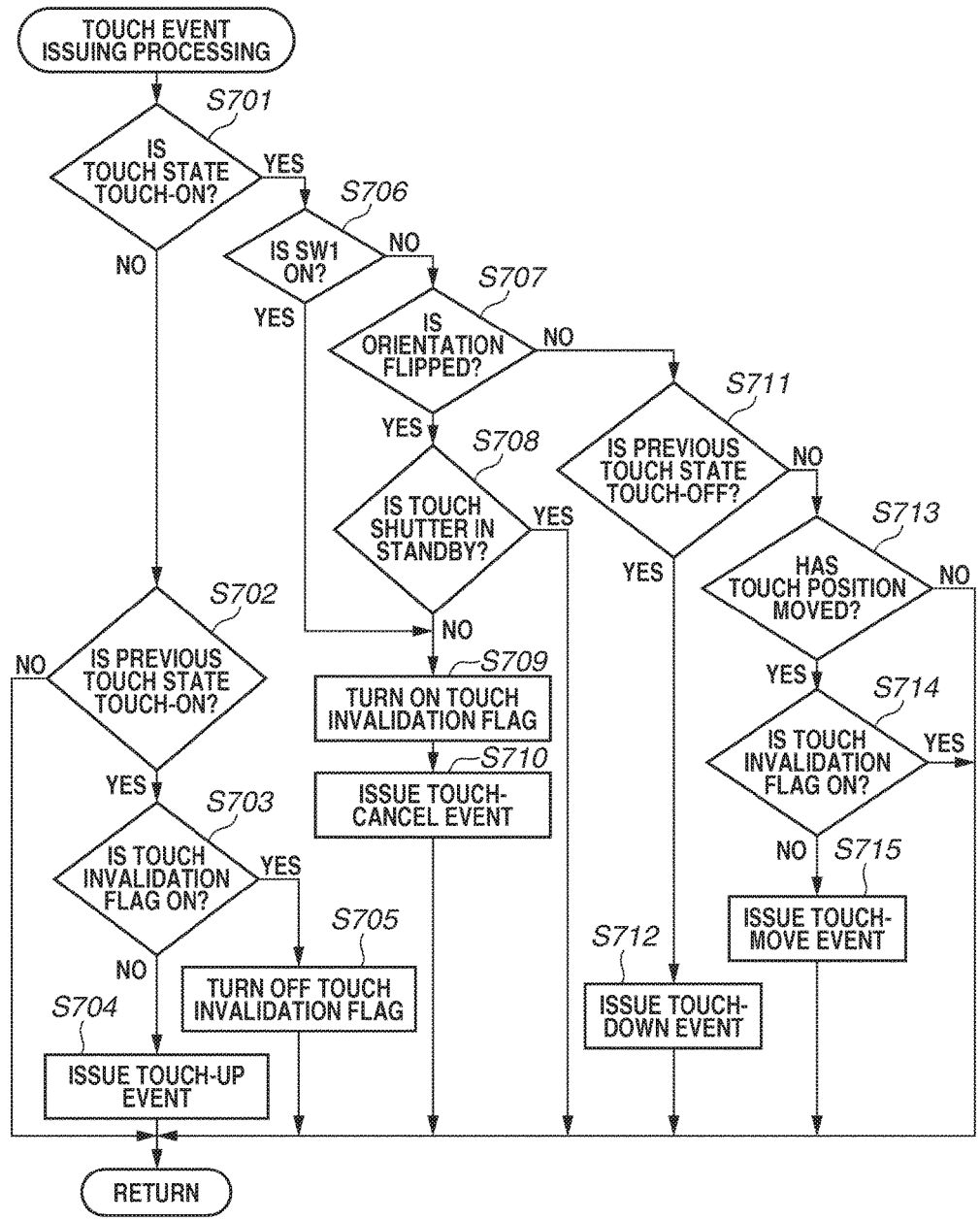
FIG. 7 is a flowchart of touch event issuing processing.

FIG. 7 illustrates a flowchart of touch event issuing processing in the exemplary embodiment. The processing is repeatedly implemented at every predetermined sampling cycle in parallel with the photographing mode processing (FIG. 5) and the menu screen processing (FIG. 6) described above. An event (command) of any one of Touch-Up, Touch-Cancel, Touch-Down, and Touch-Move is issued (notified) through interrupt processing in accordance with a state of the touch operation. The event is used for the determination on the touch operation in the processing in FIGS. 5 and 6. Depending on a state where the orientation is flipped upside down, processing is performed so that a touch that has been actually performed continuously is invalidated, so that the movement of the continuously touched position is not determined as Touch-Move, and the releasing of the touch is not determined as Touch-Up. The processing in FIG. 7 is implemented when a program recorded in the nonvolatile memory 56 is loaded into the system memory 52 and executed by the system control unit 50.

In step S701, the system control unit. 50 determines whether the touch state is Touch-On. The processing proceeds to step S706 if the touch state is Touch-On and proceeds to step S702 if the touch state is not Touch-On.

In step S702, the system control unit 50 determines whether at the previous sampling time, the touch state was Touch-On. The processing proceeds to step S703 if the previous touch state was Touch-On, and is terminated without issuing any event if the previous touch state was not Touch-On since this means that no touch operation has been performed.

In step S703, the system control unit 50 determines whether a touch invalidation flag stored in the system memory 52 is ON. The processing proceeds to step S705 if the flag is ON and proceeds to step S704 is the flag is OFF. The touch invalidation flag indicates whether the touch that has been continuously performed since before the orientation is flipped is invalidated because the orientation of the digital camera 100 is flipped for example. While the touch invalidation flag is ON, no processing is performed in accordance with a touch operation regardless of which touch operation is actually performed on the touch panel 71.

In step S704, the system control unit 50 issues a Touch-Up event since it has been determined that the touch invalidation flag is OFF (touch is valid), the previous touch state is Touch-On, and the current touch state is Touch-off, that is, that the touch has just been released. In step S705, the system control unit 50 does not issue the Touch-Up event because the touch invalidation flag is OFF (touch is invalidated) even though the previous touch state is Touch-On and the current touch state is Touch-off, and thus the touching has just been released. Still, in step S705, the system control unit 50 turns OFF the touch invalidation flag so that the next touch operation is validated, and then the processing is terminated.

In step S706, the system control unit 50 determines whether SW1 is turned ON by the half pressing on the shutter operation unit 61. The processing proceeds to step S709 where the system control unit 50 turns ON the touch invalidation flag if SW1 is ON, and proceeds to step S707 if SW1 is OFF. In the exemplary embodiment, the priority of an operation on the shutter operation unit 60 is higher than that of a touch operation on the touch panel 71. Thus, the touch operation performed at the point when the shutter operation unit 61 is operated is invalidated.

In step S707, the system control unit 50 determines whether the orientation of the digital camera 100 is flipped upside down. The processing proceeds to step S708 if the orientation is flipped upside down, and proceeds to step S711 if the orientation is not flipped upside down.

In step S708, the system control unit. 50 determines whether the touch shutter is in standby. The touch shutter is in standby when Touch-Down is performed in a touch shutter operable area in the photographing mode processing and Touch-On is continuously performed. The touch shutter is in standby until the system control unit 50 determines that Touch-Up is performed in step S517 (detects the Touch-Up event) after the system control unit 50 determines Yes in step S514 in FIG. 5 described above. When the system control unit 50 determines that the touch shutter is in standby, the touch is valid even when the orientation of the digital camera 100 is flipped upside down as described above. Thus, the touch event issuing processing is terminated without turning ON the touch invalidation flag. When the system control unit 50 determines that the touch shutter is not in standby in step S708, the processing proceeds to step S709.

In step S709, the system control unit. 50 turns ON the touch invalidation flag and invalidates the touch performed at that point.

In step S710 the system control unit 50 issues a Touch-Cancel event. Thus, the system control unit 50 switches the operation state to that in a case where no touch operation is performed even when Touch-Up of the currently performed touch is not performed. For example, in response to the issuance of the Touch-Cancel event, the touch button in the display mode indicating that the button is being touched in step S522 in FIG. 5 is switched to the display mode indicating that the button is not touched in step S525 without the function allocated to the touch button being executed.

In step S711, the system control unit 50 determines whether the touch state at the previous sampling time is Touch-Off, which is different from the current touch state. The processing proceeds to step S712 if the previous touch state was Touch-Off, and proceeds to step S713 if the previous touch state was not Touch-Off.

In step S712, the system control unit 50 issues a Touch-Down event.

In step S713, the system control unit 50 determines whether the touched position has moved for a predetermined distance or more. The processing proceeds to step S714 if the touched position has moved for the predetermined distance or more, and is terminated with no event issued if the touched position has not moved for the predetermined distance or more since this means that there is no particular change in the Touch-On state.

In step S714, the system control unit 50 determines whether the touch invalidation flag stored in the system memory 52 is ON. If the touch invalidation flag is ON, the processing is terminated without issuing the Touch-Move event even though the touched position has moved. If the touch invalidation flag is OFF, the Touch-Move event is issued since the touched position has moved.

In the exemplary embodiment described above, when the orientation of the digital camera 100 is flipped upside down while the touch panel 71 is being touched, the display of the display items is flipped, and a touch operation performed at that point is invalidated. Thus, execution of processing unintended by the user due to the mismatch between the displayed position of the display item and the touched position caused by the flipped display of the displayed items can be prevented. In the course of a touch operation for the photographing, the touch is not invalidated even when the orientation of the digital camera 100 being touched is flipped upside down, and thus, photographing is performed by the touch operation proceeding from the touch. Thus, the user does not miss the shot.

In the exemplary embodiment described above, an example is described where the touch shutter function is executed. Alternatively, touch AF may be executed with the touch shutter function turned OFF. In the touch AF, when Touch-Down is performed in an AF operable area, an AF frame is set and displayed based on the Touch-Down position, and AF is performed in the area defined by the AF frame. No operation is performed in response to Touch-Move and Touch-Up thereafter, and the actual photographing is performed when SW2 is turned. ON through the operation on the shutter operation unit 61 in the touch AF, when the orientation of the digital camera 100 is flipped upside down without the touch being released after the AF frame is set in response to Touch-Down, the touch may be invalidated, the setting on the AF frame may be canceled, and the displayed AF frame may not be displayed.

The example is described where, when the orientation of the digital camera 100 is flipped during the touch shutter operation, the touch performed at that point is invalidated. The touch may be kept valid when the orientation is flipped in other operation states. For example, the touch may be kept valid when the orientation of the digital camera 100 of which the touch panel 71 is being touched is flipped upside down while a captured image recorded on the recording medium is displayed on the display unit 28 under the playback mode. The touch may be determined to be invalidated when the orientation is flipped depending on whether the display positions and orientations of the display items are flipped in response to the flipping of the orientation. In an operation mode or a setting state in which the display positions and orientations of the display items are flipped in response to the flipping of the orientation of the camera, a mismatch between the displayed position and the touched position occurs when the orientation is flipped, and thus the touch is invalidated in the exemplary embodiment. On the other hand, in a setting state or an operation mode in which the display items are not flipped in response to the flipping of the orientation, a mismatch between the displayed position and the touched position does not occur when the orientation is flipped, and thus the touch is kept valid.

Furthermore, in the exemplary embodiment, the example is described where the display is flipped and the touch is invalidated when the orientation of the digital camera 100 is flipped upside down. Alternatively, the exemplary embodiment may be applied to other orientation changes, and the touch may be invalidated in response to such an orientation change. For example, when the orientation of the digital camera changes by about 90° from horizontal to vertical, the display items may be changed from the horizontal layout to the vertical layout, and the touch that has been continuously performed since before the orientation change may be invalidated. In this case also, the touch may not be invalidated if the display items are not changed from the horizontal layout to the vertical layout when the orientation of the digital camera changes by about 90° from horizontal to vertical.

In the exemplary embodiment, whether a display item such as a touch button is operated when the orientation of the digital camera is flipped upside down and thus the display of the displayed items is flipped may be determined by inverting the touch coordinates detected by the touch panel 71 vertically and horizontally. Specifically, the touch coordinates (x, y) are converted to coordinates (X-x, Y-y), where X and Y respectively represent lateral and vertical widths of the touch panel 71. Thus, which display item is touched in the positions of the display items (OSD) before the orientation is flipped can be determined. Accordingly, the definition of touch reception ranges of the display items needs not to be flipped.

The control operation of the control unit 50 may be performed by a single hardware unit, or shared by a plurality of hardware units so that the entire apparatus is controlled.

While the present disclosure has been described with reference to exemplary embodiments, it is to be understood that the disclosure is not limited to the disclosed exemplary embodiments. The present disclosure includes various modes not departing from the gist of the present disclosure. The exemplary embodiments described above each merely representing an embodiment of the present disclosure may be appropriately combined.

The exemplary embodiment has been described with the case where the present disclosure is applied to a digital camera as an example. The present disclosure is not limited to this example, and can be applied to any other electronic apparatuses including a touch panel and can determine an orientation of the apparatus. Specifically, the present disclosure can be applied to a tablet PC, a personal digital assistant (PDA), a mobile phone terminal, a portable image viewer, a digital photo frame, a music player, a game player, an e-reader, and the like.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electronic apparatus comprising:
    a touch panel configured to detect a touch on a display unit;
    an orientation detection sensor configured to detect an orientation of the electronic apparatus; and
    a memory and at least one processor which function as:
    a display control unit configured to perform control to change a display position of a display item displayed on the display unit from a first display position to a second display position different from the first display position if the orientation of the electronic apparatus detected by the orientation detection sensor changes from a first orientation corresponding to a regular position to a second orientation corresponding to an upside down position; and
    a control unit configured to perform control so that
    processing relating to the display item is performed when a touch is released from the first display position in a case where the orientation of the electronic apparatus changes from the first orientation to a third orientation rotated by 90 degrees from the first orientation and the display position of the display item on the display unit is kept unchanged while the first display position is being touched, and
    the processing is not performed when a touch is released from the first display position in a case where the orientation of the electronic apparatus has changed from the first orientation to the second orientation and the display position of the display item on the display unit has changed from the first display position to the second display position while the first display position is being touched.

2. The electronic apparatus according to claim 1, wherein the control unit performs control so that, if the orientation of the electronic apparatus changes from the first orientation to the third orientation while a touch, which is detected before the orientation of the electronic apparatus is changed from the first orientation, being kept detected by the touch panel, a predetermined first function corresponding to an operation of moving position of the touch is carried out, and, if the orientation of the electronic apparatus changes from the first orientation to the second orientation while an a touch, which is detected before the orientation of the electronic apparatus is changed from the first orientation, being kept detected by the touch panel, the predetermined first function is not carried out.

3. The electronic apparatus according to claim 1, wherein the control unit performs control so that, if a touch on the first display position is maintained for a predetermined period in the first orientation, a predetermined second function is carried out, while if the orientation is changed from a first orientation to the second orientation during the period, the predetermined function is not carried out.

4. The electronic apparatus according to claim 1, further comprising an image sensor, wherein the control unit performs control so that, if a touch on a display item corresponding to a photographing instruction is detected, a photographing process is started and is not stopped even if the orientation is changed from a first orientation to the second orientation during the touch.

5. The electronic apparatus according to claim 1, wherein the memory and the at least one processor further function as a photographing control unit configured to perform control so that an image is captured by the image sensor and the captured image is recorded as an image file, in a case where the touch panel detects releasing of a touch from a live view image displayed on the display unit.

6. The electronic apparatus according to claim 5, wherein the photographing control unit performs control so that a photographing preparation operation including focusing setting based on a touched position is performed when the touch panel detects a touch, and photographing is performed when the touch panel detects releasing of the touch.

7. The electronic apparatus according to claim 1, wherein, when one of a plurality of the display items is touched, the display control unit changes a display manner of an item that has been touched from a first display manner to a second display manner and, when the orientation of the electronic apparatus changes from the first orientation to the second orientation during the touch, returns the display manner from the second display manner to the first display manner.

8. The electronic apparatus according to claim 1, further comprising:
    an image sensor,
    wherein the memory and the at least one processor further function as
    a setting unit that performs control so that, if a touch is detected by the touch panel, a setting relating to focusing is set based on a touched position,
    wherein the control unit performs control so that, if the orientation of the electronic apparatus changes from the first orientation to the second orientation after the touch, the setting is canceled.

9. The electronic apparatus according to claim 1, wherein the orientation detection sensor detects an orientation of the electronic apparatus with respect to a direction of gravitational force.

10. The electronic apparatus according to claim 1, wherein the control unit is configured to perform control so that the processing is performed when the touch is released from the display item in a case where the orientation of the electronic apparatus is kept unchanged after the touch.

11. The electronic apparatus according to claim 1, wherein the control unit is configured to perform control so that a touch operation is canceled in response to the orientation of the electronic apparatus having changed from the first orientation to the second orientation after the touch.

12. The electronic apparatus according to claim 1, wherein the display item is a DISP icon.

13. The electronic apparatus according to claim 1, wherein the display control unit is configured to superimpose the display items on a live view image captured by an image capture unit.

14. The electronic apparatus according to claim 1, wherein the display item is an item for receiving an instruction to display a menu screen including a plurality of menu items corresponding to a plurality of photographing settings.

15. The electronic apparatus according to claim 14, wherein the menu items include at least one of a menu item relating to closed-eye detection or a menu item relating to camera shake correction.

16. The electronic apparatus according to claim 1, wherein the display control unit displays the display item at either one of the first display position or the second display position according to change in the orientation of the electronic apparatus.

17. The electronic apparatus according to claim 1, further comprising:
an image sensor,
wherein the memory and the at least one processor further function as
a setting unit configured to set a setting relating to focusing based on a touched position when the touch panel detects a touch,
wherein, even if the orientation of the electronic apparatus changes from the first orientation to the second orientation, the control unit performs control so as to maintain the setting relating to focusing.

18. A method for controlling an electronic apparatus, the method comprising:
detecting a touch on a display unit;
detecting an orientation of the electronic apparatus;
performing control to change a display position of a display item displayed on the display unit from a first display position to a second display position different from the first display position if the detected orientation of the electronic apparatus changes from a first orientation corresponding to a regular position to a second orientation corresponding to an upside down position; and
performing control so that
processing relating to the display item is performed when a touch is released from the first display position in a case where the orientation of the electronic apparatus changes from the first orientation to a third orientation rotated by 90 degrees from the first orientation and the display position of the display item on the display unit is kept unchanged while the first display position is being touched, and
the processing is not performed when a touch is released from the first display position in a case where the orientation of the electronic apparatus has changed from the first orientation to the second orientation and the display position of the display item on the display unit has changed from the first display position to the second display position while the first display position is being touched.

19. A non-transitory computer-readable storage medium storing a program that causes a computer to execute a method comprising:
detecting a touch on a display unit;
detecting an orientation of the electronic apparatus;
performing control to change a display position of a display item displayed on the display unit from a first display position to a second display position different from the first display position if the detected orientation of the electronic apparatus changes from a first orientation corresponding to a regular position to a second orientation corresponding to an upside down position; and
performing control so that
processing relating to the display item is performed when a touch is released from the first display position in a case where the orientation of the electronic apparatus changes from the first orientation to a third orientation rotated by 90 degrees from the first orientation and the display position of the display item on the display unit is kept unchanged while the first display position is being touched, and
the processing is not performed when a touch is released from the first display position in a case where the orientation of the electronic apparatus has changed from the first orientation to the second orientation and the display position of the display item on the display unit has changed from the first display position to the second display position while the first display position is being touched.

20. An electronic apparatus comprising:
a touch panel configured to detect a touch on a display unit;
an orientation sensor configured to detect an orientation of the electronic apparatus; and
a memory and at least one processor which function as:
a display control unit configured to perform control so as to display the display item at a first display position on the display unit if the orientation of the electronic apparatus is a first orientation, displays the display item at a second display position on the display unit if the orientation of the electronic apparatus is a second orientation that is 180 degrees different from the first orientation; and
a control unit configured to perform control so that
processing relating to the display item is performed when the touch panel detects releasing of a touch from the first display position after the touch panel detects the touch on the first display position on the display unit,
if the orientation of the electronic apparatus changes from the first orientation to an orientation in which the display position of the display item is not changed from the first display position while the first display position is being touched, and
the processing is not performed even when the touch is released from the first display position if the orientation of the electronic apparatus is changed from the first orientation to the second orientation in which the display position of the display item on the display unit is changed from the first display position to the second display position while the first display position is being touched.

21. A method for controlling an electronic apparatus, the method comprising:
detecting a touch on a display unit;
detecting an orientation of the electronic apparatus;
performing control so as to display the display item at a first display position on the display unit if the detected orientation of the electronic apparatus is a first orientation, display the display item at a second display position on the display unit if the detected orientation of the electronic apparatus is a second orientation that is 180 degrees different from the first orientation; and
performing control so that
processing relating to the display item is performed when a touch is released from the first display position after the touch on the first display position on the display unit is detected, if the orientation of the electronic apparatus changes from the first orientation to an orientation in which the display position of the display item is not changed from the first display position while the first display position is being touched, and
the processing is not performed even when the touch is released from the first display position if the orientation of the electronic apparatus is changed from the first orientation to the second orientation in which the display position of the display item on the display unit is changed from the first display position to the second display position while the first display position is being touched.

22. A non-transitory computer-readable storage medium storing a program that causes a computer to execute a method comprising:
   detecting a touch on a display unit;
   detecting an orientation of the electronic apparatus;
   performing control so as to display the display item at a first display position on the display unit if the detected orientation of the electronic apparatus is a first orientation, display the display item at a second display position on the display unit if the detected orientation of the electronic apparatus is a second orientation that is 180 degrees different from the first orientation; and
   performing control so that
   processing relating to the display item is performed when a touch is released from the first display position after the detecting detects the touch on the first display position displayed on the display unit, if the orientation of the electronic apparatus changes from the first orientation to an orientation in which the display position of the display item is not changed from the first display position while the first display position is being touched, and
   the processing is not performed even when the touch is released from the first display position if the orientation of the electronic apparatus is changed from the first orientation to the second orientation in which the display position of the display item on the display unit is changed from the first display position to the second display position while the first display position is being touched.

23. An electronic apparatus comprising:
   a display unit capable of displaying a display item for receiving an instruction to display a menu screen including a plurality of menu items corresponding to a plurality of setting items relating to photographing, wherein the plurality of menu items with each of which a setting regarding a different one of the plurality of setting items being selectable;
   a touch panel configured to detect a touch on a display unit;
   an orientation detection sensor configured to detect an orientation of the electronic apparatus; and
   a memory and at least one processor which function as:
   a display control unit configured to perform control so as to change a display position of the display item displayed on the display unit when a predetermined change of the orientation of the electronic apparatus detected by the orientation detection sensor occurs; and
   a control unit configured to perform control so that processing for displaying the menu screen is performed when, after a touch on the display item displayed on the display unit has been detected by the touch panel, the touch panel detects releasing of the touch from the display item,
   wherein the control unit performs the processing when a touch is released from the display item if a display position of the display item is unchanged when the orientation of the electronic apparatus is changed while the display item is being touched, and performs control so that, if the orientation of the electronic apparatus changes while the display item is being touched and the display position of the display item is changed, the processing is not performed even when a touch that has been detected by the touch panel since before the change in the orientation of the electronic apparatus is released.

24. The electronic apparatus according to claim 23, wherein the menu screen includes at least either one of a menu item regarding closed-eye detection or a menu item regarding camera shake correction.

25. A method for controlling an electronic apparatus, the method comprising:
   displaying a display item for receiving an instruction to display a menu screen including a plurality of menu items corresponding to a plurality of setting items relating to photographing, wherein the plurality of menu items with each of which a setting regarding a different one of the plurality of setting items being selectable;
   detecting a touch on a display unit;
   detecting an orientation of the electronic apparatus;
   performing display control so as to change a display position of the display item displayed on the display unit when a predetermined change of the detected orientation of the electronic apparatus occurs; and
   performing control so that processing for displaying the menu screen is performed when, after a touch on the display item displayed on the display unit has been detected, releasing of the touch from the display item is detected,
   wherein the performing control performs the processing when a touch is released from the display item if a display position of the display item is unchanged when the orientation of the electronic apparatus is changed while the display item is being touched, and performs control so that, if the orientation of the electronic apparatus changes while the display item is being touched and the display position of the display item is changed, the processing is not performed even when a touch that has been detected since before the change in the orientation of the electronic apparatus is released.

26. A non-transitory computer-readable storage medium storing a program that causes a computer to execute a method comprising:
   displaying a display item for receiving an instruction to display a menu screen including a plurality of menu items corresponding to a plurality of setting items relating to photographing, wherein the plurality of menu items with each of which a setting regarding a different one of the plurality of setting items being selectable;
   detecting a touch on a display unit;
   detecting an orientation of the electronic apparatus;
   performing display control so as to change a display position of the display item displayed on the display unit when a predetermined change of the detected orientation of the electronic apparatus occurs; and
   performing control so that processing for displaying the menu screen is performed when, after a touch on the display item displayed on the display unit has been detected, releasing of the touch from the display item is detected,
   wherein the performing control performs the processing when a touch is released from the display item if a display position of the display item is unchanged when the orientation of the electronic apparatus is changed while the display item is being touched, and performs control so that, if the orientation of the electronic apparatus changes while the display item is being touched and the display position of the display item is changed, the processing is not performed even when a touch that has been detected since before the change in the orientation of the electronic apparatus is released.

27. The electronic apparatus according to claim 23, wherein the display control unit is configured to perform control to change a display position of the display item displayed on the display unit from a first display position to a second display position different from the first display position if the orientation of the electronic apparatus detected by the orientation detection sensor changes from a first orientation corresponding to a regular position to a second orientation corresponding to an upside down position, and the control unit is configured to perform control so that the processing is performed when a touch is released from the first display position in a case where the orientation of the electronic apparatus changes from the first orientation to a third orientation rotated by 90 degrees from the first orientation and the display position of the display item on the display unit is kept unchanged while the first display position is being touched, and the processing is not performed when a touch is released from the first display position in a case where the orientation of the electronic apparatus has changed from the first orientation to the second orientation and the display position of the display item on the display unit has changed from the first display position to the second display position while the first display position is being touched.

* * * * *